Aug. 18, 1942.              C. W. PATTERSON              2,293,559
                                FISHING ROD
                            Filed March 20, 1940

INVENTOR
*Charles W. Patterson*
BY *Evans + McCoy*
ATTORNEYS

Patented Aug. 18, 1942

2,293,559

UNITED STATES PATENT OFFICE 2,293,559

FISHING ROD

Charles W. Patterson, Cleveland, Ohio

Application March 20, 1940, Serial No. 325,058

7 Claims. (Cl. 43—23)

This invention relates to fishing rods, and particularly to improvements in fishing rods to render them especially adaptable for casting, trolling, deep sea fishing and the like.

When it is desired to obtain maximum casting distance and maximum accuracy, the movement of the wrist is a major factor, and to obtain the above advantages the rod should be moved in a single plane. When the movement is not confined to a single plane, the distance of the cast may be decreased and a movement may be given to the lure, which will tend to impair accuracy. To maintain the conventional straight fishing rod in a single plane during casting, the wrist of the fisherman must be bent to a position where its maximum movement is impaired.

It is, therefore, an object of the present invention to provide a fishing rod which may be adjusted so that during casting, maximum movement of the wrist may be had to provide greater accuracy and distance in casting.

The adjustment of the rod will of course be slightly different for various individuals, and it is another object of this invention to provide casting rods which may be adjusted to suit the individual requirements of various individuals.

A further object is to provide a fishing rod which is adapted to be adjusted for casting, as described above, and which may be readily and easily transformed into the conventional straight rod.

In trolling, deep sea fishing and the like, it is frequently desirable that the fishing rod be held above and at an angle to the line so that when playing a fish, the rod acts as a spring to maintain tension on the line at all times. When a straight rod is used there is a tendency to allow the fishing rod to come into alignment with the line, due to the pull of the fish, whereby the spring effect of the rod is removed and likelihood of the fish disengaging itself when it suddenly changes direction is greatly increased.

It is a further object of the present invention to provide a rod which is adaptable for trolling, deep sea fishing and the like, in which the spring effect of the rod is more easily maintained.

A still further object is to provide a handle for a fishing rod to which a plurality of various sized rods may be readily and securely attached.

Other objects and advantages of the present invention will become apparent from the following detailed description accompanied by the drawing, in which like parts throughout the several views are indicated by the same reference numerals:

Figure 1:
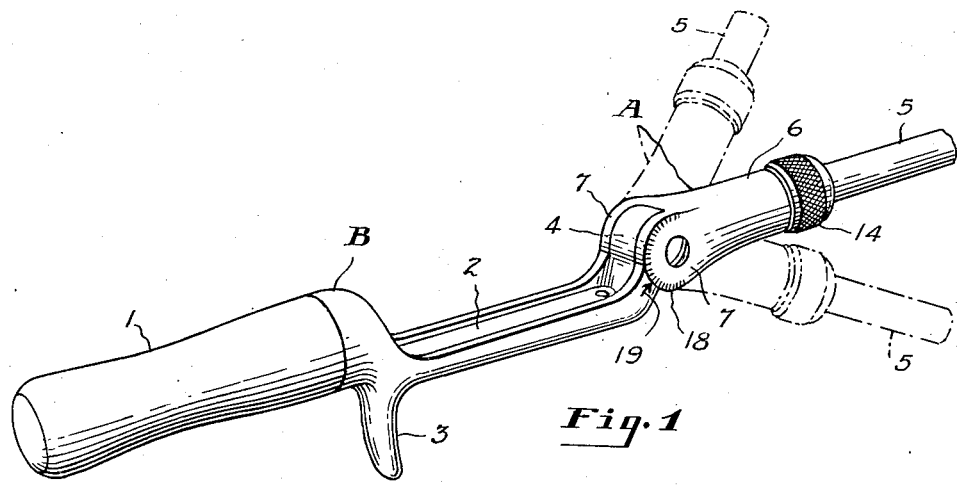
Figure 1 is a perspective view of a fishing rod handle and a portion of a rod embodying the present invention, illustrating positions to which the rod may be angularly adjusted with respect to the handle for certain purposes.
Figure 2:
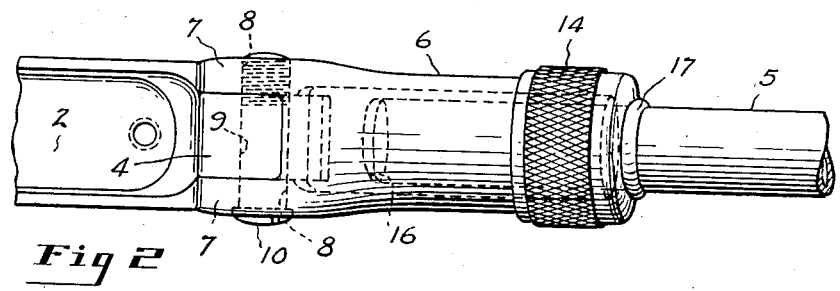
Fig. 2 is an enlarged fragmentary plan view of the fishing rod in Fig. 1 showing the pivotal connection between the handle and the rod portions.

Briefly, the present invention comprises a handle portion indicated generally by B, and a rod portion indicated generally by A. The handle B is pivotally connected to the rod A so that the two members may be angularly adjusted with respect to each other, as desired, for carrying out the purposes of the present invention. There is also provided a means whereby the handle may be locked with respect to the rod so that the two portions are fixed with respect to each other.

The handle B comprises a grip portion 1, a recess or groove 2 providing a reel mount, a finger rest or finger grip 3, and a projection or tongue 4 disposed at the end of the handle opposite the grip for attachment to the rod. The rod portion A is composed of a rod proper 5, and at the end adapted to be connected to the handle portion M is provided a ferrule 6 to facilitate the pivotal connection of the rod and handle. Ferrule 6 is bifurcated at one end, forming two prongs or arms 7 which are apertured at 8. The projections 4 of the handle is also apertured at 9 so that the projection 4 may be embraced by the arms 7, and when the apertures 8 and 9 are in register a pivot pin 10 may be inserted therethrough. The pin 10 may be threaded at one end as is the aperture 8 of one of the arms 7, and the threaded engagement of the pin and one arm retains the pin in the pivotal joint.

Figure 3:
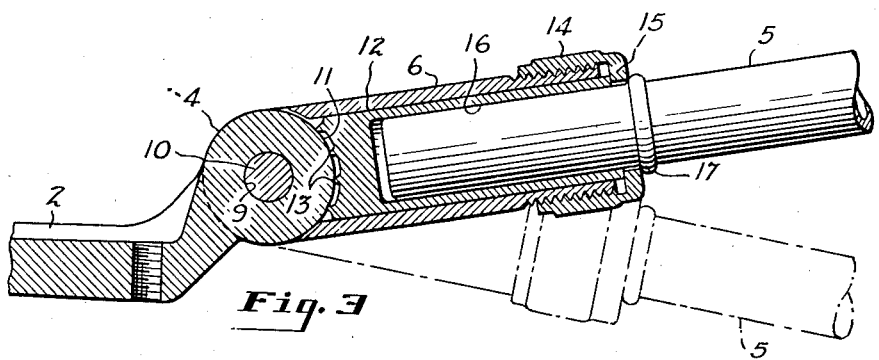
Fig. 3 is an enlarged elevational cross sectional view of the portion of the fishing rod shown in Fig. 2.
Figure 4:
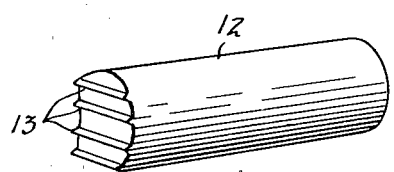
Fig. 4 is a view in perspective of a part of the means used to hold the handle in fixed angular relation with respect to the rod.

To secure the handle in fixed relation with respect to the rod, there is provided an engaging surface on one of the pivotally connected portions and a member on the other portion adapted to advance and maintain engagement with the surface and thereby prevent movement of the handle with respect to the rod. A desirable form of securing means is illustrated in Fig. 3. The tongue 4 of the handle has a rounded engaging surface 11, which is disposed between the arms 7 when the handle and rod are pivotally connected. On the rod portion, the ferrule 6 is made with an axial bore and carries a cylindrical member 12 which is movable longitudinally therein, and is provided with ribs or teeth 13 to engage the surface 11. Movement of the member 12 with respect to the ferrule is obtained by threading the ferrule on its exterior to carry a collar 14 having a circumferential flange 15 at one end thereof extending inwardly beyond the ferrule 6 to contact the end of the member 12. By screwing the collar 14 onto the ferrule 6, the flange 15 contacts the member 12 and advances it toward the handle portion so the teeth or ribs 13 will engage the surface 11 of the tongue 4 on the handle. It is contemplated that the teeth 13 or the whole tip of the member 12 may be made of a material harder than the material of the surface 11 so that the teeth 13 will tightly engage the surface 11 and hold the rod very rigidly with respect to the handle.

Another feature of the connection shown in Fig. 3 is that the rod proper 5 which may be of any suitable material, such as bamboo, steel, etc., may be securely but detachably connected to the member 12. The member 12 has a socket 16 into which the rod tightly fits, the movement of the rod into the socket 16 being limited by the circumferential rib 17 disposed on the rod. A plurality of rods may be utilized with the same handle by furnishing a member 12 having a proper size socket 16 for each size of rod desired to be used.

Since it is desirable that the rod conform to the conventional shape of fishing rods, the axis of the grip 1 is disposed in alignment with the axis of the rod portion or a continuation thereof. Further, the grip may be covered with or composed of a suitable material, such as, for example, cork.

When it is desired to use the rod for casting, it is only necessary for the user to loosen the collar 14, pivot the rod with respect to the handle so that the angular adjustment of the rod and handle will be proper for the wrist of that user. Looking at Fig. 1, a position to which the rod is moved with respect to the handle for casting is shown in the lowermost broken outline position of the rod. The broken outline position of the rod in Fig. 3 is also a position suitable for casting. In order that a user may readily obtain the same adjustment at all times, one of the arms 7 is provided with a dial 18 having suitably spaced markings (Fig. 1), and a pointer 19 is disposed on the handle adjacent the arms 7. By taking cognizance of the pointer 19, the relative angularity between the handle and the rod portions may be easily read. When the desired position for the rod with respect to the handle is found, the collar 14 may be tightened, and by the construction previously described a very rigid, secure connection will be had to maintain the angularity of the rod and handle.

With the rod adjusted to the casting position for the individual who is to use it, the rod and the arm of the user will be substantially perpendicular to the pivotal axis of the wrist of such user. The axis of the handle and grip portion will be approximately perpendicular to the natural line of the fingers, and will be in substantial alignment with the axis of the fist when in a gripping position. Thus, when a cast is made, the rod will move in a substantially single plane with the arm of the user moving in a parallel plane, and the wrist of the user being so disposed that the maximum movement thereof may be obtained without impairing the accuracy of the cast.

When it is desired to use the rod for trolling or deep sea fishing, the rod may be disposed on the side of the handle opposite its position for casting. Fig. 3 shows the rod in full lines having a slight adjustment in an upward direction, where it may be advantageously used for trolling or deep sea fishing. The uppermost dotted outline position of the rod in Fig. 1 shows another adjustment which may be more suitable to the individual when deep sea fishing or trolling.

It is a feature of the present invention that the handle portion of the rod conforms to conventional fishing rod handles in that the location of the grip with respect to the reel will be fixed and rigid regardless of the augularity between the handle and the rod portions. Furthermore, a fisherman need own only one rod, it being adaptable to deep sea fishing, casting and ordinary fishing. This feature is more desirable by the present construction wherein several different sized rods may be used to meet the various conditions to which the rod may be put.

It is to be understood that variations and modifications of the specific devices herein shown and described for puropses of illustration may be made without departing from the spirit of the invention.

What I claim is:

1. A fishing rod which comprises a rod portion, a single handle portion, said handle portion having a grip and a reel seat rigidly mounted relative to each other, means for pivotally connecting said rod and handle portions, means for locking said handle with respect to said rod when the handle is at the desired angular disposition with respect to the rod, said last mentioned means including a rounded surface on one of the pivotally connected members, a toothed portion on the other of the pivotally connected members, and means for advancing and maintaining the toothed portion in engagement with the rounded surface.

2. A fishing rod which comprises a handle portion, a rod portion, a pivotal connection between the rod and handle portions, the axis of said pivotal connection being disposed transversely of but substantially in the same plane as the axis of the rod portion, said pivotal connection including a rounded surface carried by the handle portion, a toothed portion slidably carried by the rod portion, and a collar threadably mounted on said rod portion for movement with respect to the rod portion, said collar being engageable with said toothed portion to advance it against the rounded portion carried by the handle member to lock the handle and rod with respect to each other when the handle is in the desired angular position relative to the rod.

3. A fishing rod which comprises a handle portion, a rod portion, a pivotal connection between the rod and handle portions, said pivotal connection including a rounded surface carried by the handle portion, a toothed portion slidably carried by the rod portion, and a collar threadably mounted on said rod portion for movement with respect to the rod portion, said collar being engageable with said toothed portion to advance it against the rounded portion carried by the handle member to lock the handle and rod with respect to each other when the handle is in the desired angular position relative to the rod.

4. A fishing rod which comprises a handle portion, a rod portion, a pivotal connection between the rod and handle portions to permit movement of the handle through an angle on either side of a line parallel to the axis of said handle portion, said pivotal connection including a bifurcated portion integral with said rod portion and a projection integral with said handle portion and adapted to be embraced by the prongs of the bifurcated portion, said projection having an engaging surface and said handle portion having a toothed member adapted to receive the rod and adapted to advance and maintain engagement with said surface by said teeth, thereby preventing movement of the handle with respect to the rod.

5. A fishing rod which comprises a handle portion, a rod portion, a pivotal connection between the rod and handle portions to permit movement of the handle through an angle on either side of a line parallel to the axis of said handle portion, said pivotal connection including a bifurcated member and a projection member adapted to be embraced by the two arms of the bifurcated member, one of said members being rigid with said handle portion and the other member being integral with said rod portion, one of said members having a relatively smooth engaging surface and a toothed portion which is movable angularly with the other member, said toothed portion and said engaging surface being relatively movable against and away from each other, said toothed portion being of greater hardness than said engaging surface, means for relatively maintaining the teeth of said toothed member strongly against said engaging surface, whereby the teeth will tightly engage said engaging surface and hold the rod portion rigidly with respect to the handle at any desired angle.

6. A fishing rod handle which comprises a handle portion having a rounded engaging surface, a hollow ferrule portion pivotally connected to said handle portion, means for mounting a reel on said handle portion, a member received for sliding movement within said ferrule portion and having a toothed surface at one end for engagement with said rounded engaging surface of the handle portion and having a socket at the other end for receiving and retaining the butt end of the rod proper, and a collar threadably mounted on the exterior of said ferrule portion, said collar having an annular flange for engaging said member.

7. A fishing rod which comprises a single handle portion, a rod portion, means for attaching a reel to said handle portion, a pivotal connection between the rod and handle portions to permit movement of the handle portion through an angle on either side of the axis of said handle portion, the axis of said pivotal connection being disposed transversely of but substantially in the same plane as the axis of the rod, and means for retaining said handle portion at any desired angular position with respect to the rod portion within the range of movement of the handle relative to the rod.

CHARLES W. PATTERSON.